Sept. 8, 1964      F. A. WETTSTEIN      3,147,990
STABILIZING SYSTEM FOR VEHICLES
Filed Jan. 17, 1962
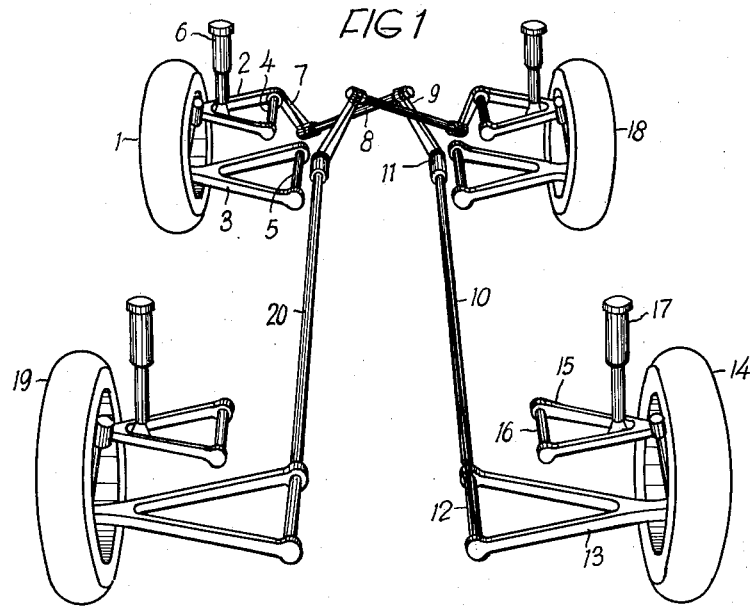
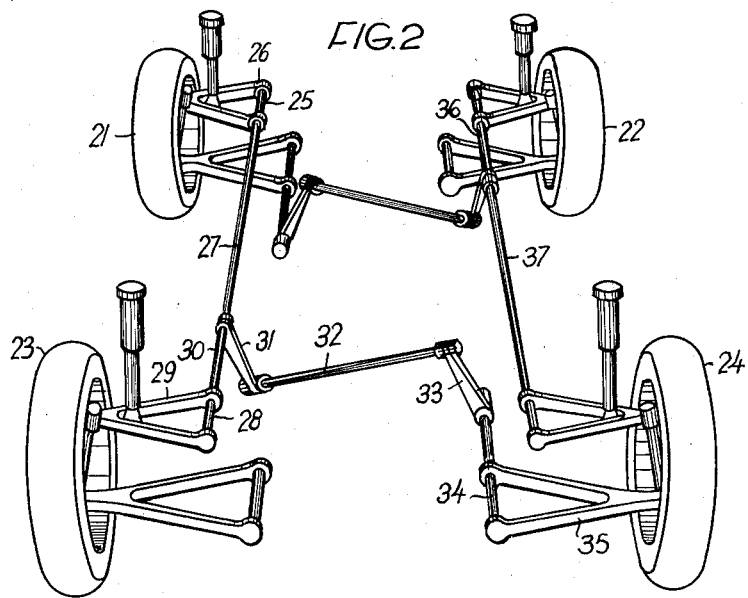
INVENTOR.
Fritz Alexander Wettstein,
BY Pierce, Scheffler & Parker
his Attorneys

United States Patent Office 3,147,990
Patented Sept. 8, 1964

3,147,990
STABILIZING SYSTEM FOR VEHICLES
Fritz Alexander Wettstein, Goteborg, Sweden, assignor to
AB Volvo, Goteborg, Sweden
Filed Jan. 17, 1962, Ser. No. 166,781
Claims priority, application Sweden Jan. 25, 1961
5 Claims. (Cl. 280—104)

This invention relates to a mechanical stabilizing system for 4-wheel vehicles. Conventional systems of this type usually comprise a torsion bar which by means of arms interconnects the wheels on one and the same axle of the vehicle and tends to prevent rolling motions, without influencing the body spring-suspension means, in case of parallel, unidirectional springing movement of the wheels.

The object of the invention is to provide a stabilizing system which counteracts not only rolling motions but also pitching motions of vehicles the wheels of which are articulated to the chassis by means of transverse suspension arms swingable about longitudinal pivot shafts and wherein the weight of the vehicle is taken by separate suspension springs, which may be dashpot springs, provided between each wheel and the sprung part of the vehicle. The invention is characterized by the fact that the system comprises a pair of torsion bars extending longitudinally of the vehicle, one end of each torsion bar being rigidly connected to the pivot shaft of a suspension arm of a wheel, and the other end having an arm which by means of a link element is articulated to an arm on the pivot shaft of the suspension arm of the diametrically opposed wheel, such as to cause the wheels thus interconnected to perform unidirected spring actions.

In one simple embodiment of the invention the stabilizing system is provided between one front wheel and the rear wheel on the opposite side of the vehicle, but modifications may be made for different purposes.

Two different embodiments of the invention are described more closely with reference to the annexed drawing, in which FIG. 1 is a diagrammatic perspective view of one embodiment and FIG. 2 is a similar perspective view of a modified embodiment.

For the sake of clearness, only the members relevant to the invention are illustrated. Consequently, the frame and the body of the vehicle are not shown in the drawing. Considering FIG. 1 of the drawings, the wheel 1 of the vehicle is in a conventional manner articulated to the sprung part of the vehicle by means of an upper suspension arm 2 and a lower suspension arm 3. The pivot shafts 4 and 5, respectively, of the suspension arms are mounted in the sprung part of the vehicle. A dashpot-type suspension spring 6 is inserted between the suspension arm 2 for each wheel and the sprung or body part. Secured to the suspension arm 2 is an arm 7 the free end of which is articulated to a link element 8 which connects the arm 7 to another arm 9 on a torsion bar 10 mounted at 11 longitudinally of the vehicle. The torsion bar 10 is secured to the pivot shaft 12 of the lower suspension arm 13 of the diagonally opposite vehicle wheel 14. This wheel is guided by an upper suspension arm 15 on a pivot shaft 16 mounted in the sprung part of the vehicle. The spring action of this wheel is taken by a dashpot-type suspension spring 17.

An analogous stabilizing and wheel suspension system including a connecting torsion bar 20 is provided for the other diagonal pair of wheels 18, 19.

The mode of operation of the system is as follows. When the vehicle is taking a bend the centrifugal force exerts a moment of force on the sprung part of the vehicle about the longitudinal axis thereof resulting, for instance, in that the wheels 18 and 14 simultaneously spring down while the wheels 1 and 19 simultaneously spring up. The upward springing action of the wheel 1 causes via the upper suspension arm 2 a turning movement of the pivot shaft 4 in a clockwise direction, this movement being transmitted, by means of the arm 7, the link element 8 and the arm 9, to the corresponding end of the torsion bar 10, imparting thereto a turning movement in the counterclockwise direction. At the same time, the downward spring action of the wheel 14 causes, via the suspension arm 13, a turning movement in a clockwise direction of the other end of the torsion bar 10 which consequently will be twisted or strained. In a similar manner, considering the behavior of diagonal wheels 18 and 19 the torsion bar 20 will be simultaneously strained, and both torsion bars will counteract the rolling motion of the vehicle.

If, upon a braking operation, the sprung part of the vehicle makes a pitching motion about a transverse axis the wheels 1 and 18 will spring up and the wheels 14 and 19 will spring down. As a result thereof, the movements of the interconnected wheels 1 and 18 will strain the torsion bar 10 so as to counteract the pitching motion. The torsion bar 20 will be strained or twisted in a similar manner, through the interconnection of wheels 19 and 14.

If instead of the condition just described, the diagonal wheel pair 1 and 14 simultaneously springs up, the movements of the suspension arms 2 and 13 will turn the torsion bar 10 in a single direction. If the lengths of the suspension arms and the arms 7 and 9 are appropriately related to each other equally long movements of the wheels will not cause any torsion of the bar 10. The same holds true, of course, of the stabilizing system for the other pair of diagonal wheels 18, 19.

Consequently, the stabilizing system will not influence the vehicle suspension in case of equally long and unidirected spring actions, that is, upon parallel springing movement of diametrically opposite wheels. This fact and the stabilizing teaching of this invention are highly important when the vehicle runs on an irregular road in which case the springing amplitude of two diametric wheels is always varying as compared with the springing amplitude of the other diametric wheels. In contrast thereto, in a vehicle having conventional anti-roll members between the front wheels and between the rear wheels the suspension springs will be influenced upon parallel springing movements of diametrically opposed wheels, resulting in that the suspension spring action becomes considerably stiffer and harsher and in that the frame and body of the vehicle is subjected to heavy torsion stresses.

It will be obvious that the stabilizing system according to this invention will not affect the suspension springs in case of parallel springing movement of all four wheels, which type of springing movement occurs especially at high speeds of the vehicle.

The stabilizing system of this invention is particularly advantageous in combination with air type suspension springs and levelling devices, resulting in a very soft and effective spring action which is a condition for satisfactory riding and travelling characteristics. However, a soft spring action may cause impermissibly great rolling and pitching motions of the vehicle which can be effectively prevented by means of the stabilizing system according to this invention without impairing the overall springing characteristics in case of diagonal or parallel springing movements. Even in case of springing movements of a single wheel the influence upon the suspension means is inconsiderable, since in that case the torque action of the torsion bars 10 and 20 is only half the action occurring in case of rolling and pitching movements. Consequently, the stabilizing system renders possible a soft and effective spring action under all running conditions, as well as a satisfactory stability of the vehicle with moderate rolling motion when the vehicle is taking a bend and with small pitching movements during acceleration and braking operations.

The parallel, longitudinally disposed torsion bars 10 and 20 counteract the rolling action of the vehicle, when wheels 18 and 14 move down, while wheels 1 and 19 move up. Such movements of the vehicle wheels produce opposite twists in bars 10 and 20. With braking action, when the vehicle "pitches," the interconnected front wheels and the interconnected back wheels will produce opposite twists or strains in bars 10 and 20, thus compensating for the pitch.

Simultaneous up or down movement of diagonal pairs of wheels will cause, for example, suspension arms 2 and 13 to turn bar 10, without twisting it. In other words, the stabilizing system will not influence the suspension system in the event of equally long, undirected spring actions between diametrically opposed wheels.

In the modified embodiment shown in FIG. 2 the wheels 21, 22, 23 and 24 of the vehicle are also articulated to the sprung part, not shown, of the vehicle by means of lower and upper suspension arms. The pivot shaft 25 of the upper suspension arm 26 of the wheel 21 is rigidly connected with a torsion bar 27 which may be termed a diagonal stabilizer. The pivot shaft 28 of the upper suspension arm 29 of the wheel 23 on the same side of the vehicle is likewise rigidly connected to a torsion bar 30 which may be termed a cross-stabilizer. The confronting ends of the diagonal stabilizer 27 and the cross-stabilizer 30 are firmly connected with an arm 31 which is mounted for turning movement in the sprung part of the vehicle. The two torsion bars 27 and 30 may be a single unit. A crossbar 32 connects the arm 31 with another arm 33 which is mounted for turning movement in the sprung part of the vehicle and rigidly connected with the pivot shaft 34 of the lower suspension arm 35 of the wheel 24 on the other side of the vehicle. The wheels 21, 22 and 24 are likewise interconnected by means of a cross-stabilizer 36 and a diagonal stabilizer 37.

The mode of operation of the system shown in FIG. 2 will be apparent from the description of FIG. 1. The cross-stabilizers 30 and 36 are not influenced by pitching motions about the transverse axis of the vehicle, whereas the diagonal stabilizers 27 and 37 will be strained, the resistance to pitching being consequently determined solely by the diagonal stabilizers, whereas the cross-stabilizers as well as the diagonal stabilizers will be strained upon rolling motion about the longitudinal axis of the vehicle. Any desired relation between the resistance to rolling and the resistance to pitching can be readily obtained by suitable choice of the stabilizers.

What I claim is:

1. A stabilizing system for 4-wheel vehicles, comprising
a wheel assembly for each wheel;
an upper and lower transverse suspension arm connected to each of said wheel assemblies and swingable about longitudinal pivot shafts;
a separate spring element for each wheel assembly;
a pair of torsion bars extending longitudinally of the vehicle, one end of each torsion bar being rigidly connected to the pivot shaft of one of said suspension arms of one of the wheels;
a first radially extending arm connected to said torsion bar adjacent to its other end;
a second radially extending arm connected to one of the suspension arms of a wheel diametrically opposed to said one wheel, and extending in the opposite direction from the said first radially extending arm;
a link element rigidly connecting said first and second radially extending arms.

2. A stabilizing system according to claim 1, in which said torsion bars consist of tubes.

3. A stabilizing system according to claim 1, in which the pivot shafts of the upper suspension arms of the said wheels on one side of the vehicle are interconnected by means of said torsion bar, said torsion bar and the pivot shaft of the lower suspension arm of one of the wheels on the opposite side of the vehicle each being provided with the said radially extending arms, which are interconnected by means of the said link element.

4. A stabilizing system according to claim 1, wherein the pivot shafts of the said upper suspension arms on both sides of the vehicle, considered individually as to sides, are interconnected by means of the said torsion bars, each of said torsion bars and the pivot shaft of the lower suspension arm of a wheel on the opposite side of the vehicle each being provided with the said radially extending arms, which arms are interconnected by means of the said link element.

5. A stabilizing system for 4-wheel vehicles, comprising
a wheel assembly for each wheel;
upper and lower transverse suspension arms connected to each of said wheel assemblies and swingable about longitudinal upper and lower pivot shafts, respectively;
a separate spring element for each wheel assembly;
a pair of torsion bars extending longitudinally of the vehicle, one end of each torsion bar being rigidly connected to the pivot shaft of the lower suspension arm of one of the wheels;
a first radially extending arm connected to the other end of said torsion bar;
a second radially extending arm being attached to the upper suspension arm of a wheel diametrically opposed to said one wheel;
and a link element connecting said radially extending arms.

References Cited in the file of this patent

UNITED STATES PATENTS 2,191,211    Krotz _____ Feb. 20, 1940

FOREIGN PATENTS 45,936    France _____ Oct. 21, 1935
57,260    France _____ Oct. 8, 1952
     (2nd Add. to 980,291)